United States Patent [19]

Duthie

[11] Patent Number: 4,995,931
[45] Date of Patent: Feb. 26, 1991

[54] METHOD FOR FORMING COMPONENTS FROM FIBRE-REINFORCED THERMOPLASTIC MATERIALS

[75] Inventor: Antony C. Duthie, Semley, England

[73] Assignee: Westland Helicopters, Ltd., Yeovil, England

[21] Appl. No.: 452,409

[22] Filed: Dec. 19, 1989

[30] Foreign Application Priority Data

Dec. 22, 1988 [GB] United Kingdom ............... 8829993

[51] Int. Cl.$^5$ ............................................. B32B 31/20
[52] U.S. Cl. .................................. 156/212; 156/214;
  156/244; 156/242; 156/308.4; 264/248
[58] Field of Search ............... 156/212, 214, 222, 224,
  156/242, 308.4, 583.3; 264/241, 248

[56] References Cited

U.S. PATENT DOCUMENTS 3,421,967  1/1969  Hochner .................. 156/224 X
3,423,267  1/1969  Munk ....................... 156/214
4,545,105 10/1985  Kowalsky ................ 156/212 X

FOREIGN PATENT DOCUMENTS 320155  6/1989  European Pat. Off. .

Primary Examiner—Robert A. Dawson
Attorney, Agent, or Firm—Larson & Taylor

[57] ABSTRACT

A single stage method for forming and joining pre-consolidated sheets of fibre-reinforced thermoplastics material each having an adherent polymer layer in those areas that are to be joined comprises locating one of the sheets in a female mould tool cavity which is heated to the fusion bonding temperature of the adherent layers. A second sheet, located in register with the cavity is heated to its melt temperature and formed to shape by a male mould tool part while simultaneously applying pressure to the areas of the sheets to be joined together to form the component.

5 Claims, 1 Drawing Sheet

METHOD FOR FORMING COMPONENTS FROM FIBRE-REINFORCED THERMOPLASTIC MATERIALS

BACKGROUND OF THE INVENTION

1. Field of the Invention

This invention relates to a method for forming components from fiber-reinforced thermoplastic materials and is particularly concerned with forming such components from at least two pre-consolidated constituent parts at least one of which has to be re-shaped and at least one other of which provides a reinforcing function.

2. Description of the Prior Art

The aircraft industry makes wide use of fiber reinforced thermoplastic materials and many components of the above construction exist in that field. For example, conventional stiffening ribs have a web portion and a peripheral reinforced flange portion and a bulkhead may well include internal web stiffeners in addition to peripheral reinforced flange portions.

Traditionally such components are made by pre-consolidation of a sheet of material of a desired thickness for forming to the shape of the web portion and flanges, and pre-consolidation of one or more reinforcing sheets of a desired thickness. Firstly, the web portion sheet and possibly the reinforcing sheet is/are formed to shape in a mould tool and, secondly, the sheets are transferred to an assembly tool under appropriate heat and pressure for a desired period of time to fusion bond the sheets. During consolidation the sheets may be provided with a co-moulded adherent polymer layer in those areas that are eventually to be attached together to assist fusion bonding as disclosed in European published patent application EP-A-0320155.

This two stage process is therefore time consuming and costly in that separate mould and assembly tools are required.

SUMMARY OF THE INVENTION

Accordingly this invention provides a method for forming a component from fiber-reinforced thermoplastic materials and including at least one sheet of material to be formed to final shape and at least one reinforcing sheet comprising the steps of, pre-consolidating individual sheets of fiber-reinforced thermoplastic material each incorporating a co-moulded adherent polymer layer in those areas of the individual sheets that are eventually to be attached together, locating the reinforcing sheet in a female mould tool part, locating the sheet to be formed to shape in register with the female mould tool part, locating a male mould tool part in register with the surface of the sheet of material to be formed to shape opposite to the surface in register with the female mould tool part, and, with the sheet to be formed to shape at its melt temperature and the mould tool parts at the fusion bonding temperature of the adherent polymer layers, bringing the mould tool parts together to form to shape the said sheet of material to be formed to shape and simultaneously applying pressure to the areas of the sheets incorporating said adherent polymer layers, maintaining the temperature of the mould tool parts for a predetermined time to ensure fusion bonding of the sheets, cooling the mould tool part and removing the component.

The male mould tool part may be resilient so that pressure applied in one plane to form to shape said sheet of material automatically results in pressure in another plane for applying said simultaneous pressure. The resilient male mould tool part may be rubber.

The adherent polymer layer may comprise either a crystalline polymer having a melting point below that of the sheets of thermoplastic material or an amorphous polymer having a glass transition temperature below that of the melting point of the sheets. Preferably the melting point of the crystalline polymer or the glass transition temperature of the amorphous polymer is at least 10° C. below the melting point of the sheets.

BRIEF DESCRIPTION OF THE DRAWINGS

The invention will now be described by way of example only and with reference to the accompanying drawings in which.

DETAILED DESCRIPTION OF THE DRAWINGS

Figure 1:
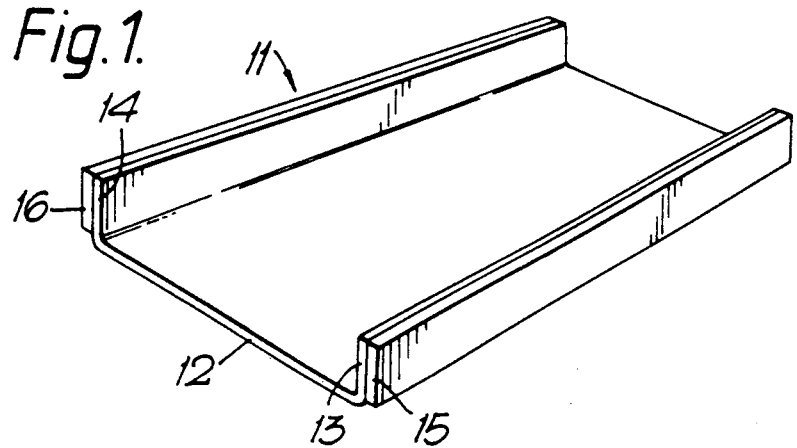
FIG. 1 is a perspective view of a simple channel section component constructed according to the method of this invention.

FIG. 1 illustrates an elongated channel section 11 constructed from fiber reinforced thermoplastic materials in accordance with the method of this invention. The simple channel section has been chosen for explanatory purposes since it will be understood that the invention is by no means limited to use in the manufacture of such simple components and can be used in the manufacture of more complex components having a greater number of constituent parts as will become evident hereinafter.

Channel section 11 comprises a web portion 12 and two upstanding flange portions 13 and 14 extending throughout its length. Flange portions 13 and 14 are generally perpendicular to the plane of the web portion 12 and are provided with reinforcing sheets 15 and 16 of fiber reinforced thermoplastic material.

Sheets 15 and 16 are first pre-consolidated by hot press forming from a required number of laminae of fiber-reinforced thermoplastic material to build up the desired thickness and a co-moulded adherent polymer layer 23 is incorporated on the surfaces that are to be attached to flange portions 13 and 14.

A further flat sheet of material comprising the developed shape of the web portion 12 and flange portions 13 and 14 of channel 11 is similarly pre-consolidated from a required number of laminae of fiber-reinforced thermoplastic material with a co-moulded adherent polymer layer 24 incorporated on the surfaces that are to be attached to reinforcing sheets 15 and 16.

The adherent polymer layers 23 and 24 may comprise either a crystalline polymer having a melting point below that of the sheets of thermoplastic material or an amorphous polymer having a glass transition temperature lower that the melting point of the sheets. Preferably the respective melting point or glass transition temperatures are at least 10° C. lower than the melting point of the sheets.

Figure 2:
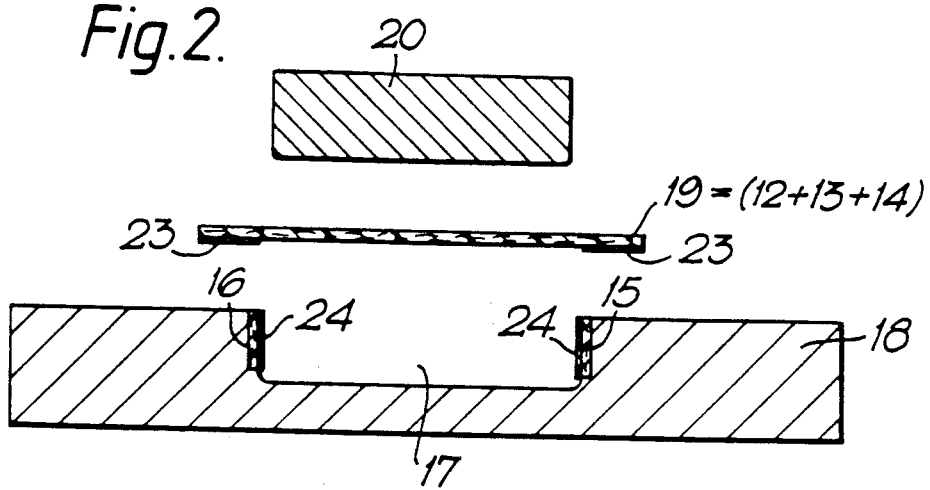
FIG. 2 is a cross section illustrating one stage in the method.

Referring now to FIG. 2, reinforcing sheets 15 and 16 are located along respective edges of a cavity 17 of a female mould tool part 18 with the adherent layers 23 located inwardly. The sheet to be formed to shape comprising the developed shape of web and flange portions 12, 13 and 14 (FIG. 1) and identified by numeral 19 in FIG. 2 is located in appropriate register with the cavity 17 of female mould tool part 18, and a resilient rubber male mould tool part 20 is located above the sheet 19.

The edge regions of sheet 19 carrying the adherent layers 24 are lowermost.

Sheet 19 is heated to a temperature sufficient to melt the thermoplastic material. The temperature will vary depending on the material being used and is, for example, about 400° C. for Poly Ether Ether Ketone (PEEK) matrix materials. The male and female mould tool parts 18 and 20 are heated to a temperature above the respective melt or glass transition temperatures at which fusion bonding of the adherent polymer layers 23 and 24 can occur, typically about 280° C. The actual temperature will again depend on the material of the adherent layer, examples of suitable materials being amorphous polyethersulphone (PES) having a glass transition temperature of 220° C., and amorphous polyetherixide (PEI) having a glass transition temperature of 213° C.

Heating of sheet 19 is accomplished conveniently using electric heating elements which are located on one or both sides of the sheet for movement away from the sheet just prior to forming. The mould tool parts can be heated by location in the heated platens of a platen press.

Figure 3:
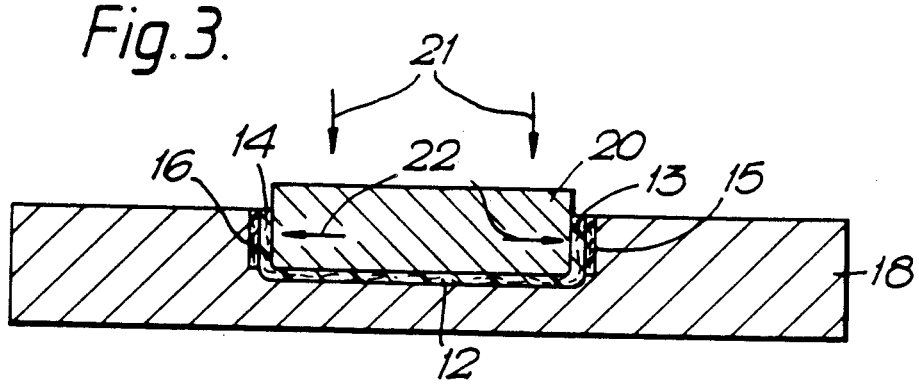
FIG. 3 is a cross section similar to FIG. 2 and illustrating a further stage.

Male mould tool part 20 is moved into cavity 17 of female mould tool part 18 to form sheet 19 into the channel section 11 with web portion 12 and upstanding flange portions 13 and 14 (FIG. 3). The temperature of the sheet 19 falls rapidly as heat dissipates into the larger bulk of the mould tool parts 18 and 20 which are maintained at the appropriate fusion bonding temperature and pressure for a predetermined time to ensure fusion bonding of the flange portions 13 and 14 to the respective reinforcing sheets 15 and 16.

In the illustrated embodiment bonding pressure is automatically achieved by the use of rubber for the male mould tool part 20 because downward pressure as indicated by arrows 21 results in outward horizontal pressure indicated by arrows 22 being applied to the mated perpendicularly oriented parts 13, 15 and 14, 16.

The mould tool parts 18 and 20 are allowed to cool and the finished component is removed.

Thus the method of the present invention provides a single stage process for final forming to shape of a component including the application of reinforcing material in desired areas, and is accomplished in a single tool.

It will be understood that the reinforcing material may comprise material to be used in the form of stiffeners, flanges, localised reinforcement around holes etc. or any combination of same in a particular component.

Whilst described with reference to a simple channel section it is envisaged that the invention will be of particular benefit in the manufacture of more complex components. In the aircraft industry such components may include a typical rib component having corrugated reinforced flange portions and a bulkhead component having a peripheral reinforced flange and web plate reinforcing stiffeners. In the latter case the pre-consolidated stiffeners appropriately provided with an adherent polymer layer could be located in recesses in the surface of cavity 17 of female mould tool part 18 so as to be fusion bonded to the surface of the web portion 12 after forming of the channel section 11 and during the hereinbefore described fusion bonding stage.

Consequently whilst one embodiment has been described and illustrated it will be understood that many modifications may be made without departing from the scope of the invention as defined in the appended claims. For example, any known method of forming and pre-consolidating the sheets may be used instead of hot press forming method such as autoclave or conventional mould tool forming. Any alternative means such as infra-red heaters or hot gas may be used to heat sheet 19, and the mould tool parts may contain individual heating means such as electrical elements or hot gas or liquid ducts to maintain the parts at the desired fusion bonding temperatures.

What is claimed is:

1. A method for forming a component from fiber reinforced thermoplastic materials and including at least one sheet of material to be formed to final shape and at least one reinforcing sheet, comprising the steps of,
   pre-consolidating individual sheets of fiber reinforced thermoplastic material each incorporating a co-moulded adherent polymer layer in those areas of the individual sheets that are eventually to be joined together,
   locating the reinforcing sheet in a female mould tool part,
   locating the sheet to be formed to shape in register with the female mould tool part,
   locating a male mould tool part in register with the surface of the sheet of material to be formed to shape opposite to the surface in register with the female mould tool part,
   and, with the sheet to be formed to shape at its melt temperature and the mould tool parts at the fusion bonding temperature of the adherent polymer layers, bringing the mould tool parts together to form to shape the said sheet of material to be formed to shape and simultaneously applying pressure to the areas of the sheets incorporating said adherent polymer layers,
   maintaining the temperature of the mould tool parts for a predetermined time to ensure fusion bonding of the sheets, cooling the mould tool parts and removing the component.

2. A method according to claim 1, wherein said male mould tool part is resilient so that applied pressure in one plane to form to shape said sheet results automatically in said simultaneous application of pressure in another plane to assist said fusion bonding of the sheets.

3. A method according to claim 2, wherein said resilient male mould tool part is rubber.

4. A method according to claim 1, wherein said adherent polymer layer comprises either a crystalline polymer having a melting point below that of the sheets of thermoplastic material or an amorphous polymer having a glass transition temperature below that of the melting point of the sheets.

5. A method according to claim 4, wherein the melting point of the crystalline polymer or the glass transition temperature of the amorphous polymer is at least 10° C. below the melting point of the sheets.

* * * * *